B. R. WRIGHT.
BRAKE FOR CENTRIFUGAL MACHINES.
APPLICATION FILED APR. 15, 1920.
1,407,777.
Patented Feb. 28, 1922.
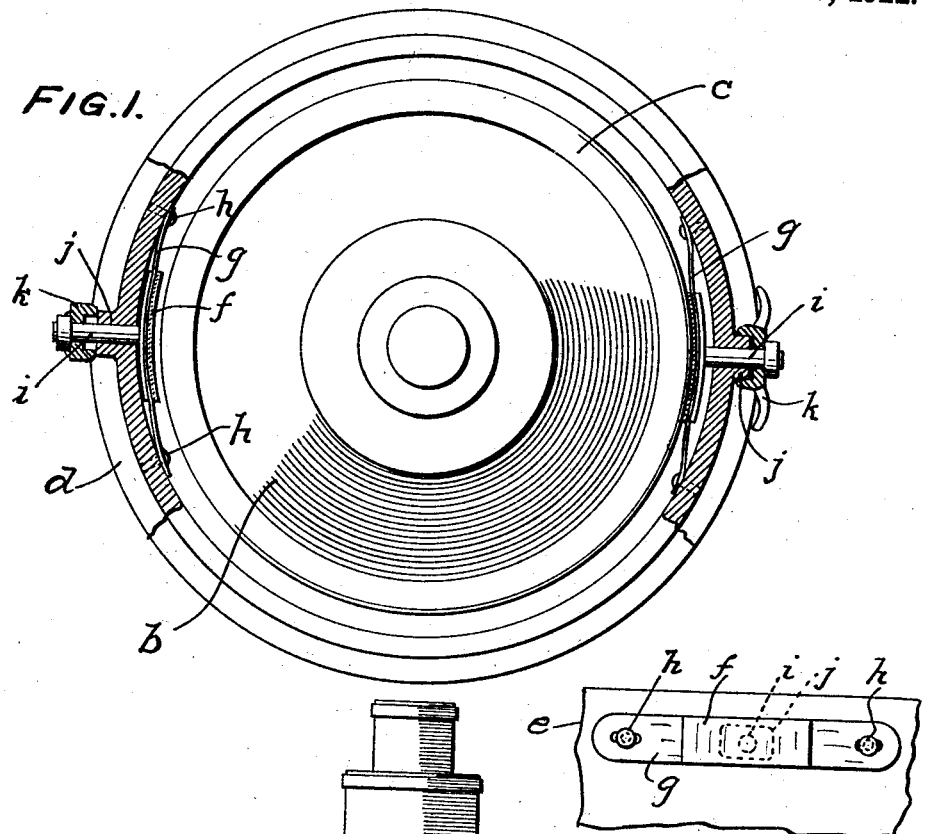
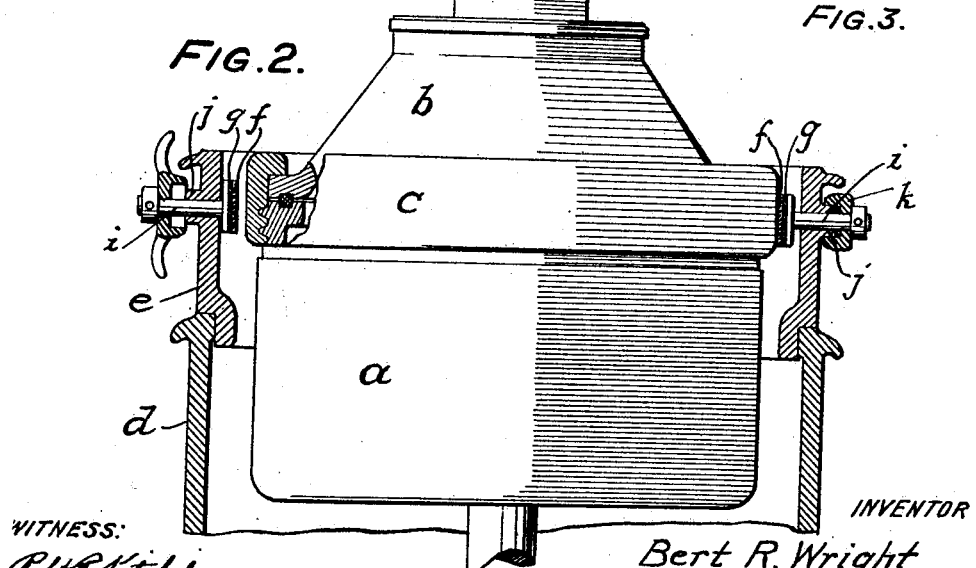
WITNESS:
Rob.R.Kitchel.
INVENTOR
Bert R. Wright
BY
Frank S. Busser
ATTORNEY.

UNITED STATES PATENT OFFICE.

BERT R. WRIGHT, OF POUGHKEEPSIE, NEW YORK, ASSIGNOR TO THE DE LAVAL SEPARATOR COMPANY, OF NEW YORK, N. Y., A CORPORATION OF NEW JERSEY.

BRAKE FOR CENTRIFUGAL MACHINES.

1,407,777.   Specification of Letters Patent.   Patented Feb. 28, 1922.

Application filed April 15, 1920. Serial No. 374,039.

*To all whom it may concern:*

Be it known that I, BERT R. WRIGHT, a citizen of the United States, residing at Poughkeepsie, county of Dutchess, and State of New York, have invented a new and useful Improvement in Brakes for Centrifugal Machines, of which the following is a full, clear, and exact description, reference being had to the accompanying drawings, which form a part of this specification.

My invention is an improvement in means for stopping the rotation of centrifugal bowls. The object of my invention is to provide means for bringing a high speed centrifugal bowl to rest without danger of causing the separable members of the bowl to seize together and without any tendency to cause separation of the parts because of their rotative inertia.

Many of the separator bowls manufactured by the assignee of this invention comprises a bowl shell and a bowl top secured together by an annular nut technically called a coupling ring. For a bowl revolving in a clockwise direction, a coupling ring for the upper end of the bowl is made with a left hand thread and one for the bottom of the bowl with a right hand thread. In either case, if there were accidental contact with a stationary part of the machine the tendency would be to screw the coupling ring tighter on the bowl rather than to loosen it.

I know that it is old to provide brake shoes to rub against the bowl itself, but there are two serious objections to this practice. The friction between the shoes and the bowl generates considerable heat and causes the bowl to expand in the coupling ring which, moving rapidly through the surrounding air, is kept cooler. This results in great difficulty in removing the coupling ring. Another objection is that if the coupling ring is slightly loose and the brakes applied with excessive pressure, momentum of the ring may cause it to unscrew from the bowl creating a condition of great danger to life and property.

In the accompanying drawings, which show a preferred embodiment of my invention:

Fig. 1 is a top view of the bowl and a horizontal section through the brake and the supporting ring.

Fig. 2 is an elevational view of the bowl, partly in section, and a vertical section of the brake and part of the frame.

Fig. 3 is a fragmentary view showing one of the brake members in elevation.

$a$ is a bowl shell, $b$ the bowl top, and $c$ the coupling ring. $d$ is the frame of the machine and $e$ a brake-carrying ring, detachable from the frame. $f$ is the brake shoe proper, $g$ a flat spring adapted to force the shoe against the bowl, and $h$, $h$ retaining members passing through slots in the spring $g$ and secured in the ring $e$. $i$ is the brake-retracting bolt, which extends through the rectangular lug $j$ and has its horizontal dimension greater than its vertical dimension. On the bolt $i$ is a handle $k$ having a socket adapted when the handle is turned into one position, to fit over and surround the lug $j$ and when the handle is turned into another position, to have its nearer together sides abut against the end of the lug $j$ and retain the brake in its retracted position.

When the brake shoe is retracted and the handle turned into the position shown at the left hand side of Figs. 1 and 2, the brake shoe is held safely clear of the coupling ring and the bowl can be operated in the usual manner. When it is desired to stop the bowl, the operator turns each brake retracting handle to the other position, so that the socket in it can fit over the rectangular lug $j$ and permit the spring $g$ to force the brake shoe $f$ against the coupling ring $c$, as shown at the right hand side of Figs. 1 and 2. The force due to friction of the shoe on the ring is in the direction to screw the ring onto the bowl, so there is no danger of the bowl coming apart. The friction is all against the largest and the outside member of the bowl so that if, in spite of the rapid air circulation around it, there is any heating of the coupling ring, it will tend to cause easier opening of the bowl rather than to make its opening more difficult.

After the bowl comes to rest, the brakes may be retracted and the ring $e$ removed, so that the bowl may be opened and handled in the usual manner.

Having now fully described my invention, what I claim and desire to protect by Letters Patent is:

1. In a centrifugal machine, the combination with a revolvable bowl comprising a plurality of parts, one of which is of greater external diameter, and screw-threading means to hold them together, of a brake shoe adapted to be pressed against the part of greater diameter.

2. In a centrifugal machine, the combination with a revolvable bowl, of a brake shoe adapted to be pressed against the larger diameter member of the bowl, and means operable to retract the shoe from the bowl.

3. In a centrifugal machine, the combination with a supporting frame and a revolvable bowl comprising a member with a male thread and another member with a mating female thread, of a brake shoe supported from the frame, a spring adapted to cause frictional engagement of the shoe against the bowl member having the female thread, manually operable means to retract the shoe from engagement, and means to maintain the shoe retracted.

4. In a centrifugal machine, the combination with a supporting frame and a revolvable bowl comprising members screwed together, of a brake shoe, a spring adapted to force the shoe into frictional engagement with the female threaded member, a handle manually operable to retract the shoe from engagement, and means on the handle and the frame coactable, in one position of the handle, to prevent movement of the shoe toward the bowl.

5. In a centrifugal machine, the combination with a supporting frame and a bowl comprising members screw-threaded together, of a ring, separable from the frame, a brake shoe carried by the frame, means tending to force the shoe into engagement with the interiorly threaded member of the bowl, and other means adapted for manual operation to retract the brake shoe from the bowl and to maintain the shoe retracted.

6. In a centrifugal machine, the combination with a revolvable bowl comprising a plurality of parts and a screw-threaded connection between them, of a brake comprising a shoe and its shank, a frame in which said shank is slidable toward and from the bowl, a spring tending to press the shoe into engagement with the bowl, a handle on the shank by means of which the shoe is retractible, said handle being turnable, and means on the frame adapted, when the handle is turned into a given position, to hold the shoe retracted.

7. In a centrifugal machine, the combination with a revolvable bowl comprising a shell, a top and a coupling ring, of a brake shoe adapted to be pressed against the coupling ring.

8. In a centrifugal machine, the combination with a revolvable bowl comprising a shell, a top and a coupling ring, of a brake shoe, a spring tending to force the shoe against the coupling ring, manually operable means to retract the shoe from the coupling ring, and means to maintain the shoe retracted.

In testimony of which invention, I have hereunto set my hand, at Poughkeepsie, on this 9th day of April, 1920.

BERT R. WRIGHT.